(12) United States Patent
Pedersen et al.

(10) Patent No.: US 9,571,942 B2
(45) Date of Patent: Feb. 14, 2017

(54) HEARING DEVICE AND A METHOD OF COMPENSATING A FREQUENCY DIFFERENCE BETWEEN A TRANSMITTER AND RECEIVER

(75) Inventors: Brian Dam Pedersen, Ringsted (DK); Karsten Filsø Jørgensen, Skodsborg (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 13/879,355

(22) PCT Filed: Oct. 14, 2011

(86) PCT No.: PCT/EP2011/068027
§ 371 (c)(1),
(2), (4) Date: Jul. 24, 2013

(87) PCT Pub. No.: WO2012/049311
PCT Pub. Date: Apr. 19, 2012

(65) Prior Publication Data
US 2013/0301858 A1  Nov. 14, 2013

(30) Foreign Application Priority Data

Oct. 14, 2010 (DK) ................................. 2010 00937
Apr. 6, 2011 (DK) ................................. 2011 00259

(51) Int. Cl.
*H04R 25/00* (2006.01)
*H04L 7/02* (2006.01)

(52) U.S. Cl.
CPC ............... *H04R 25/554* (2013.01); *H04L 7/02* (2013.01); *H04R 2225/55* (2013.01); *H04R 2460/03* (2013.01)

(58) Field of Classification Search
USPC ........................................................ 381/315
See application file for complete search history.

(56) References Cited

U.S. PATENT DOCUMENTS 5,361,398 A * 11/1994 Christian ............... H04H 20/67
375/356
7,778,432 B2   8/2010 Larsen
2007/0242702 A1* 10/2007 Shim ................... H04L 12/2602
370/516

FOREIGN PATENT DOCUMENTS

CN   1409561 A   4/2003
CN   1459166 A   11/2003
(Continued)

OTHER PUBLICATIONS

International Search Report and Written Opinion dated Dec. 16, 2011 for PCT Patent Application No. PCT/EP2011/068027.
(Continued)

*Primary Examiner* — Amir Etesam
(74) *Attorney, Agent, or Firm* — Vista IP Law Group, LLP

(57) ABSTRACT

A hearing device includes: a processing unit; a filter; and a wireless receiver; wherein the processing unit is configured to determine a time difference between a start of the wireless receiver and a reception of a corresponding data packet from a transmitter; wherein the filter is configured to determine a time period as a function of a plurality of time differences that include the time difference determined by the processing unit; and wherein the processing unit is further configured to control the wireless receiver such that the wireless receiver is started in the time period before reception of a subsequent data packet from the transmitter.

17 Claims, 4 Drawing Sheets

(56) References Cited

FOREIGN PATENT DOCUMENTS

| CN | 101506754 A | 8/2009 | |
|----|----|----|----|
| EP | 0 829 967 A2 | 3/1998 | |
| EP | 1 995 880 A1 | 11/2008 | |
| JP | 2007-184687 A | 7/2007 | |
| WO | 2007/104308 A1 | 9/2007 | |
| WO | WO 2007104308 | * 11/2007 | ............. H04R 25/00 |

OTHER PUBLICATIONS

Notification of Reasons for Rejection mailed Apr. 7, 2015, for corresponding Japanese Patent Application No. 2013-533237, 6 pages.
Notification of the Second Office Action dated Dec. 22, 2015, for corresponding Chinese Patent Application No. 201180060351.6, 15 pages.
Notification for First Office Action dated Feb. 25, 2015, for corresponding Chinese Patent Application No. 201180060351.6, 21 pages.
Notification of the Third Office Action dated Jul. 21, 2016, for corresponding Chinese Patent Application No. 201180060351.6, 10 pages.

* cited by examiner

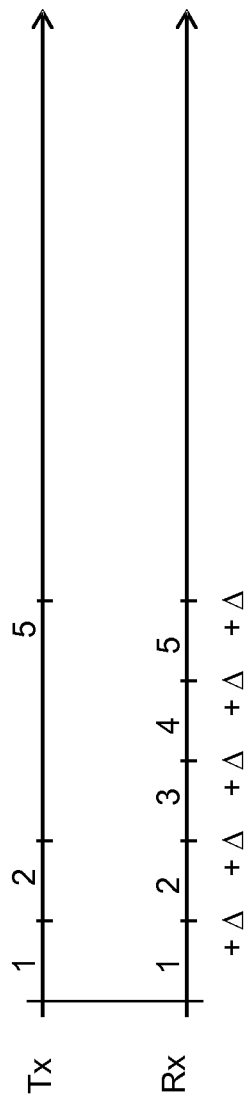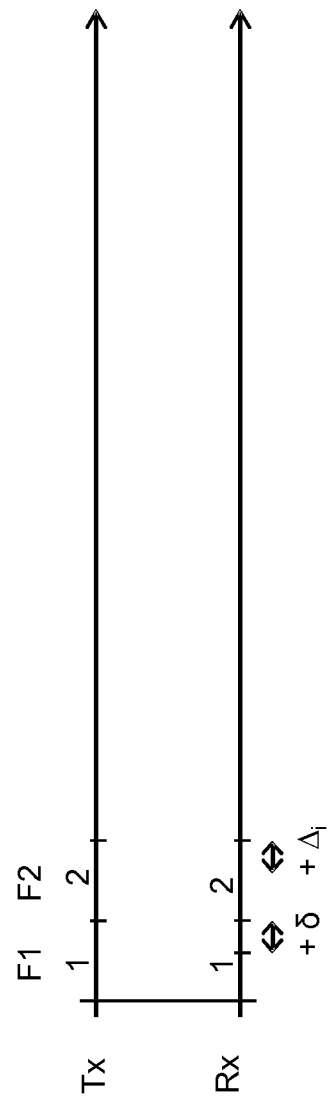

HEARING DEVICE AND A METHOD OF COMPENSATING A FREQUENCY DIFFERENCE BETWEEN A TRANSMITTER AND RECEIVER

RELATED APPLICATION DATA

This application is the national stage of International Patent Application No. PCT/EP2011/068027, filed Oct. 14, 2011, which claims priority to and the benefit of Danish Patent Application No. PA 2010 00937, filed on Oct. 14, 2010, and Danish Patent Application No. PA 2011 00259, filed on Apr. 6, 2011. The disclosures of all of the above applications are expressly incorporated by reference herein.

FIELD

The present specification relates to a hearing device adapted to compensate a frequency difference between a transmitter and a receiver. The specification further relates to a hearing device adapted to compensate a frequency difference between a transmitter and a receiver in case a communication link between these is disrupted for a period of time. Additionally, the present specification relates to a corresponding method.

BACKGROUND

In a hearing device system, data may be transmitted between a transmitting participant and a receiving participant. For example, data may be transmitted via a wireless link between two hearing device in a binaural hearing device system, or between microphone placed externally with respect to a hearing device and the hearing device. In both the transmitting and the receiving participants, a crystal oscillator may be contained. The crystal oscillator may provide clock signals in the participants on which signals the transmission and reception is based. In order to save energy, it may be advantageous to compensate for differences between the oscillator crystal frequency.

Therefore, an object for one or more embodiments described herein is to provide a compensation of the differences between the oscillator crystal in the transmitting participant and the oscillator crystal in the receiving participant in a wireless network.

Another object is to optimize the probability of recovering a lost link between a transmitting and a receiving participant i.e. when a period of communication disruption ends.

SUMMARY

The above and other objects are achieved by a hearing device comprising a processing unit, a filter, and a wireless receiver, wherein the processing unit is adapted to determine a time difference between a start of the wireless receiver and a reception of a corresponding data packet from a transmitter, and wherein the filter is adapted to determine a time period as a function of a number of the measured time differences. The processing unit is optionally further adapted to control the wireless receiver such that the wireless receiver is started the time period before reception of a subsequent data packet from a transmitter.

It is an advantage of the hearing device that the time period by which the receiver is started before reception of data may be reduced and/or minimized because the time period is based on the actual time difference between the start of the receiver and the start of reception of data from the transmitter. Thus, the energy consumption of the receiver may be reduced.

The filter of the hearing device may comprise a plurality of taps adapted to receive the plurality of time differences from the processing unit. The filter may be a FIR filter. The filter and/or coefficients thereof may be contained in the processing unit and/or in a memory device. The taps of the filter may be used cyclically.

In one or more embodiments, the function may comprise the measured time differences and a number of lost data packages since last successful reception of a data packet. Thereby, the hearing device may advantageously compensate for a number of lost data packages from the transmitter because the number of lost data packages is included in the function for calculating the time period. Likewise, the time differences may be included in the function.

The function comprises an average over a plurality of the measured time differences. Thereby, the hearing device may advantageously calculate the time difference as an average over a plurality of measured time differences between the start of the receiver and the start of reception of data from the transmitter. Thereby, fluctuations may be averaged out.

A further advantage of a hearing aid wherein the function comprises an average over a plurality of the measured time differences is that the hearing device may utilize a first time period for a first number of receptions and a second time period for a second number of reception. For example, when the filter has not received enough time differences to calculate a sufficiently accurate or suitable average, then the hearing device may utilize a first time period which may be preset. When the filter has achieved a sufficient accuracy, then the hearing aid may utilize the average value calculated by the filter. In one or more embodiments, the hearing device may use a time period calculated as a function, e.g. a sum, of the first and second time periods.

The average may be chosen from the group consisting of an arithmetic mean and a geometric mean and a harmonic mean and quadratic mean.

The filter may be adapted to provide a first time period for a first number of receptions and a second time period for a second number of receptions.

The average may be calculated each time the plurality of taps has been received a time differences.

Further disclosed is a method of compensating a frequency difference between a wireless receiver and a transmitter, the method comprising determining a time difference between a start of the wireless receiver and a reception of a corresponding data packet from the transmitter; determining a time period as a function of a number of the measured time differences; and starting the wireless receiver the time period before reception of a subsequent data packet from a transmitter.

In the method, the function may comprise the measured time difference and a number of lost data packages since a last successful reception of a data packet.

In the method, the function may comprise an average over a plurality of the measured time differences.

The method may comprise providing a first time period for a first number of receptions and a second time period for a second number of receptions.

The method may comprise calculating the average when each tap of a filter has received a time differences.

The method and embodiments thereof has the same advantages as the hearing device.

A hearing device includes: a processing unit; a filter; and a wireless receiver; wherein the processing unit is configured to determine a time difference between a start of the wireless receiver and a reception of a corresponding data packet from a transmitter; wherein the filter is configured to determine a time period as a function of a plurality of time differences that include the time difference determined by the processing unit; and wherein the processing unit is further configured to control the wireless receiver such that the wireless receiver is started in the time period before reception of a subsequent data packet from the transmitter.

Optionally, the filter comprises a plurality of taps configured to receive the plurality of time differences from the processing unit.

Optionally, the taps of the filter are configured to perform cyclically.

Optionally, the filter comprises a FIR filter.

Optionally, the filter is implemented in the processing unit, in a memory device, or in both.

Optionally, the function is associated with the determined time difference and a number of lost data packages since a last successful data packet reception.

Optionally, the function comprises an average over the plurality of time differences.

Optionally, the average comprises an arithmetic mean, a geometric mean, a harmonic mean, or a quadratic mean.

Optionally, the time period is for a first number of receptions, and the filter is configured to provide a second time period for a second number of receptions.

Optionally, the filter is configured to determine the time period based on an average operation.

Optionally, the filter is configured to determine an additional time period when the filter has received a new time difference.

A method of compensating a frequency difference between a wireless receiver and a transmitter, the method includes: determining a time difference between a start of the wireless receiver and a reception of a corresponding data packet from the transmitter; determining a time period as a function of a plurality of the time differences that include the determined time difference; and starting the wireless receiver in the time period before reception of a subsequent data packet from the transmitter.

Optionally, the function is associated with the determined time difference and a number of lost data packages since a last successful data packet reception.

Optionally, the function comprises an average over the plurality of time differences.

Optionally, the time period is determined for a first number of receptions, and the method further comprises determining a second time period for a second number of receptions.

Optionally, the time period is determined based on an average operation.

Optionally, the time period is determined using a filter, and the method further comprises determining an additional time period when filter has received a new time difference.

Optionally, the filter comprises a plurality of taps.

Further advantages and further embodiments are disclosed below.

BRIEF DESCRIPTION OF THE DRAWINGS

The drawings illustrate the design and utility of various features described herein, in which similar elements are referred to by common reference numerals. In order to better appreciate how the above-recited and other advantages and objects are obtained, a more particular description will be rendered, which are illustrated in the accompanying drawings. These drawings depict only exemplary features and are not therefore to be considered limiting in the scope of the claims.

FIG. 4 shows an embodiment in which a number of packages from the transmitting participant are not received by the receiving participant.

FIG. 5 shows an embodiment, in which the receiving participant is adapted to start its receiver a fixed time period δ before the transmitting participant transmits data.

DETAILED DESCRIPTION

Figure 1:
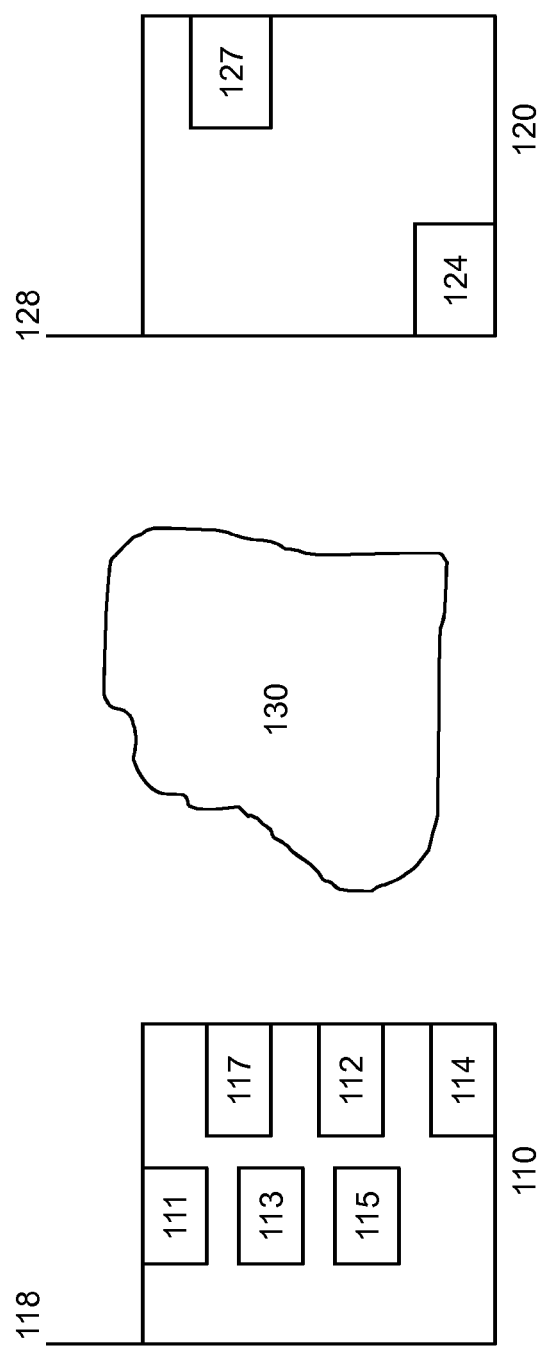
FIG. 1 shows an embodiment of a hearing device system comprising a first hearing device and a second device.

Various features are described hereinafter with reference to the figures. It should be noted that the figures are not drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated feature needs not have all the aspects or advantages shown. An aspect or an advantage described in conjunction with a particular feature is not necessarily limited to that feature and can be practiced in any other features even if not so illustrated, or if not so explicated described.

In the above and below, a hearing device may be selected from the group consisting of a hearing aid, a hearing prosthesis, and the like. Examples of a hearing device may include a behind the ear (BTE) hearing aid, an in the ear (ITE) hearing aid, a microphone placed externally with respect to a hearing device, a device streaming data to a hearing device, etc.

FIG. 1 shows an embodiment of a hearing device system 100 comprising a first 110 hearing device and a second device 120.

In one or more embodiments, the second device 120 may be selected from the group consisting of a second hearing device, a mobile telephone, a cordless telephone, a television, a fitting instrument fitting the first 110 hearing device to a user's hearing disability, a remote control, and an intermediate device.

In one or more embodiments, the intermediate device may be a device communicating with the first hearing device 110 using a first communication protocol and with a third device (not shown) using another communication protocol. For example, the intermediate device may communicate with the first hearing device 110 using a frequency band in the ISM frequency band and a Bluetooth-like protocol with low power requirements (such as disclosed in U.S. Pat. No. 7,778,432, incorporated by reference hereinto), and a standard Bluetooth protocol without low power requirements between the intermediate device and the third device. For example, the first hearing device 110 may be a hearing aid, and the third device may be a Bluetooth enabled mobile telephone, and the intermediate device may provide communication between the hearing aid and the mobile telephone using the low power communication protocol to communicate with the hearing aid and a Bluetooth protocol to communicate with the mobile telephone.

In one or more embodiments, the intermediate device may comprise a microphone.

The first 110 hearing device and the second device 120 may be communicatively coupled via a wireless network 130 as disclosed below.

The first hearing device 110 may comprise one or more microphones 111 and at least one transducer 112 such as a receiver 112. Additionally, the first hearing device 110 may comprise a processing unit 113 such as a digital signal processor (DSP). The DSP 113 may be communicatively coupled to the microphone 111 and the receiver 112. The communicative coupling may be embodied via electrical wires, a printed circuit board (PCB) or the like.

The microphone 111 may receive an audio signal which is converted into a digital signal by an analog to digital converter (ADC, not shown). The digital signal may be transmitted from the ADC to the DSP 113, thereby enabling the DSP to modify the digital signal to accommodate a hearing deficiency of a user of the hearing device 110.

The modified digital signal may be transmitted from the DSP 113 to the receiver 112, which may convert the modified digital signal into a modified audio signal. The modified audio signal may be transmitted towards the tympanic membrane of the user via the receiver 112.

The hearing device 110 may comprise a memory device 115 such as a volatile or non-volatile memory device.

The hearing device 110 and/or the second device 120 may comprise respective communication units 114, 124 such as transceivers i.e. a combined transmitter and receiver. In one or more embodiments, the hearing device 110 may comprise a transmitter 114 and the second device 120 a receiver 124 or vice versa. In one or more embodiments, the hearing device 110 may comprise a transceiver 114 and the second device 120 a receiver 124 or vice versa.

The respective communication units 114, 124 may be communicatively coupled to respective antennas, 118, 128 e.g. via the PCB.

The hearing device 110 and the second device 120 may communicate via the respective communication units 114, 124 in order to establish the wireless network 130.

In one or more embodiments, the hearing device 110 and the second device 120 may communicate via the wireless network 130 using a number of frequency channels. In one or more embodiments, the number of frequency channels may be 31 frequency channels. In one or more embodiments, the number of frequency channels may be selected from the ISM (Industrial, Scientific and Medical) radio bands.

Generally, the DSP 113 of the first hearing device 110 may be communicatively coupled, possible via other components such as ADCs or DACs, to all the components in the first hearing device 1101. i.e. the clock generator 117, the one or more microphones (via an ADC), the at least one transducer 112 (via an DAC), the communication unit 114, and the memory device 115. The coupling may be provided by a PCB or the like.

In one or more embodiments, the functionality of one or more of the components may be included in the DSP 113. For example, the memory device 115 may be contained in the DSP 113.

In one or more embodiments, the first hearing device 110 and the second device 120 may comprise respective clock generators 117, 127 for generating respective clock signals.

In one or more embodiments, the first hearing device 110 may e.g. be a receiving participant receiving data from a transmitting participant e.g. the second device 120 via the wireless network 130. In another embodiment, the second device 120 may e.g. be a receiving participant receiving data from a transmitting participant e.g. the first hearing device 110 via the wireless network 130. In one or more embodiments, the first hearing device 110 and the second device 120 may e.g. be receiving participants receiving data from a transmitting participant e.g. a broadcasting system or the like. In this embodiment, the second device 120 may be a hearing device.

Figure 2:
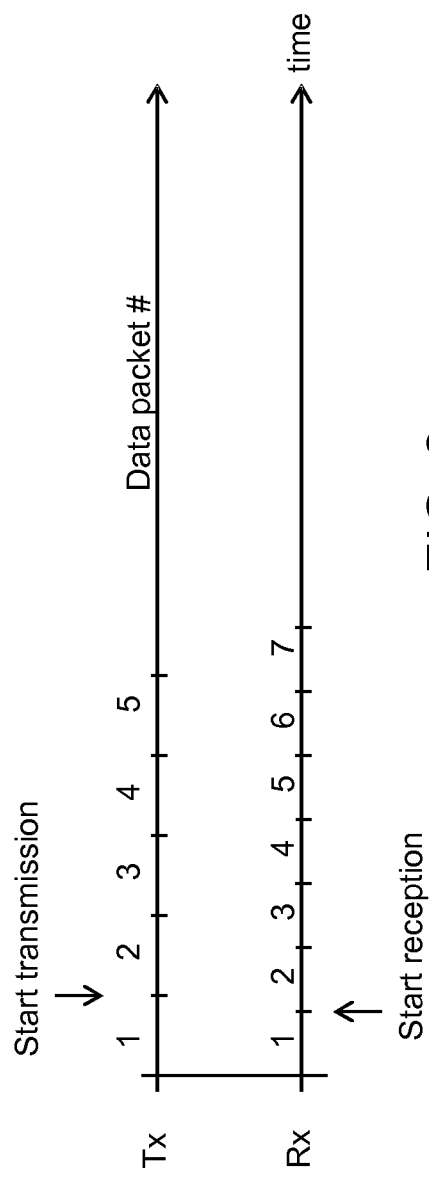
FIG. 2 shows an embodiment in which the transmitting participant Tx transmits data out of synchronization with the receiving participant Rx.

FIG. 2 shows an embodiment in which the transmitting participant Tx transmits data out of synchronization with the receiving participant Rx.

In one or more embodiments, the clock generator of the transmitting participant and the receiving participant may each comprise an oscillator crystal such as a quartz crystal or the like. The two clock generators may operate at (slightly) different frequency even though their oscillator crystals are supposed to be identical. The difference may be caused by oscillator crystal variations within the production tolerances of the oscillator crystals. For example, one oscillator crystal may oscillate at 16 MHz while the other oscillator crystal oscillates at 16.000025 MHz. Such a difference in frequency may yield problems during transmission and reception because the transmitting and receiving participants may disagree on the timing of events e.g. the receiving participant starts receiving at the end of a transmission from the transmitting participant. Such a frequency difference may provide a situation as indicated in FIG. 2, in which the receiver of the receiving participant is opened out of synchronization with the transmitter of the transmitting participant in a number of slots 1, 2, 3, 4, 5, etc.

Figure 3:
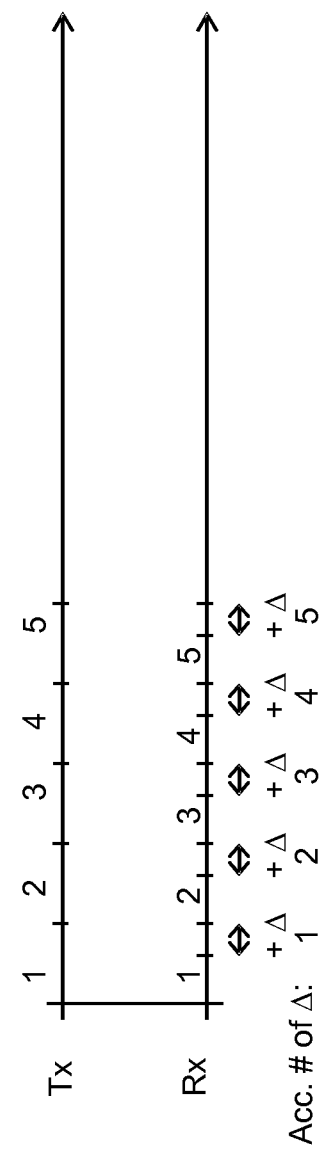
FIG. 3 shows an embodiment in which the frequency difference between the receiving participant and the transmitting participant is compensated.

FIG. 3 shows an embodiment in which the frequency difference between the receiving participant and the transmitting participant is compensated.

To compensate for a frequency difference between the crystal oscillator of the transmitting participant and the crystal oscillator of the receiving participant, the receiving participant may be adapted to start its receiver 112 a time period δ (see below for a definition of δ) before the transmitting participant transmits data, such as a data packet, to the receiving participants.

In one or more embodiments, the receiving participant may utilize a reception protocol, e.g. stored in the memory device 115 of the receiving participant (and possibly also in the transmitting participant). The reception protocol may define a time period between transmission of a first data packet and a subsequent second data packet from the transmitting participant. Using this time period, the DSP 113 of the receiving participant may calculate when a subsequent data packet is transmitted from the transmitting participant based on information on a data packet was received.

For example, if the time period between two subsequent data packages is 1 ms and the receiving participant has just received a data package, then the receiving participant may calculate that the next data package is to be received in 1 ms. If the oscillator crystal of the receiving participant oscillates at 16 MHz, then the next data package should be received after 16000 oscillations of the oscillator crystal insofar the crystal oscillator of the receiving and transmitting participants are identical.

Pruning

In one or more embodiments, the receiving participant may, in order for the receiving participant to compensate for possible differences between the oscillator crystal in the receiving participant, respectively the transmitting participant, be adapted to start its receiver 112 at a smallest possible margin before the transmitting participants transmits data, such as a data packet, using a $\Delta_{avg}$ and a function of the number of lost receptions since last successful reception of a data packet. The function could be an addition, multiplication or the like.

$\Delta_{avg}$ may be a running average calculated as described below, see equation (1). For each transmitted data packet, the receiving participant may compensate the start of the receiver by the time period $\Delta_{avg}$. Further, the receiving participant may detect the actual time difference $\Delta_i$ between the start of the receiver 112 and when the data from the transmitting participant is received. Thus, $\Delta_{avg}$ and $\Delta_i$ may differ.

Each of the time differences $\Delta_i$ may be stored in the memory device 115 of the receiving participant. The DSP 113 of receiving participant may calculate a running average over the time differences stored in the memory device 115. The running average may be calculated as $$\Delta_{avg} = \frac{\sum_{i=1}^{n} \Delta_i}{n}.$$

The running average $\Delta_{avg}$ may be embodied as a filter comprising a number of taps, e.g. a plurality of taps. For example, the running average may be embodied as a running average FIR filter comprising a plurality of taps such as 8.

The filter may be contained in the DSP 113 and/or in the memory device 115.

In one or more embodiments, n may be a counter representing a number of memory elements or taps in a filter containing an $\Delta_i$ i.e. n=2 if two memory elements/taps containing $\Delta_i$'s are comprised in the memory device 115 or filter. n may be limited by a number N of memory elements/taps in the memory device/filter allocated for storing $\Delta_i$'s, such as for example 32 i.e. 32 memory element/taps are allocated for the storing.

In one or more embodiments, the memory device may contain a fixed number N of memory elements/taps, e.g. 32 memory elements/taps, which may be used cyclically i.e. such that the first $\Delta_i$ ($\Delta_1$) is stored in a first memory element/tap, the second $\Delta_i$ ($\Delta_2$) is stored in a second memory element/tap, the $n^{th}$ $\Delta_i$ ($\Delta_n$) is stored in an $n^{th}$ memory element/tap, the $N+1^{st}$ $\Delta_i$ ($\Delta_{N+1}$) is stored in the first memory element/tap, the $N+2^{nd}$ $\Delta_i$ ($\Delta_{N+2}$) is stored in the second memory element/tap, and so on.

In one or more embodiments, the running average is calculated each time N memory elements/taps have been stored in the memory device 115 or filter.

In one or more embodiments, the running average is calculated each time a new $\Delta_i$ is stored in a memory element/tap of the memory device 115 or filter.

$\Delta_{avg}$ may thus be an average over time differences caused by the frequency difference between the oscillator crystal in the receiving participant and the transmitting participant.

As is seen in FIG. 3, the accumulated compensation amounts to $\Sigma_{j=1}^{k}\Delta_{avg,j}$, where j represents the data packet number.

FIG. 4 shows an embodiment in which the connection between the first hearing device 110 and the second device 120 has been interrupted in a number of data packages from the transmitting participant to the receiving participant. In the figure, two data packages, package 3 and 4, have not been received by the receiving participant.

In this embodiment, the receiving participant is adapted to compensate the start of reception utilizing the last calculated $\Delta_{avg}$ for which a data packet was received. The receiving participant may utilize the last calculated $\Delta_{avg}$ for each slots in which no data packets are received. The transmitting participant is assumed to transmit data at the same rate i.e. maintaining the same interval between the data packages.

Further in this embodiment, $\Delta_{avg}$ is not updated when no data package is received and thus, no $\Delta_i$ is determined.

The inventive idea is that the timing difference between the receiving participant and the transmitting participant maintains substantially unchanged even though one or more data packages from the transmitting participant are lost. This may be due to the fact that the frequency difference between the crystal oscillator of the transmitting participant and the crystal oscillator of the receiving participant remains substantially unchanged over time e.g. within seconds.

The receiving participant may continue to compensate using $\Delta_{avg}$ for a specified period of time such as for example one minute. One minute is the time period over which it may be reasonable to expect a retrieving of a lost communication link to be reestablished.

FIG. 5 shows an embodiment, in which the receiving participant is adapted to start its receiver 112 a fixed time period δ before the transmitting participant transmits data to the receiving participants in a first number F1 of transmissions, e.g. the transmission of the first data package, or the first two data packages, or the first N data packages. In one or more embodiments, the number of transmissions F1 corresponds to the time until the running average filter has been completed i.e. until each of the taps in the running average filter has received data (e.g. a $\Delta_i$).

For each of the first number of transmissions F1, the receiving participant detects the time difference $\Delta_i$ between the start of the receiver 112 of the receiving participant and the start of transmission by the transmitting participant.

As above, each of the time differences $\Delta_i$ is stored in a memory device 115 of the receiving participant. The DSP 113 of receiving participant calculates a running average over the time differences $\Delta_i$ stored in the memory device 115.

In one or more embodiments, the running average may be calculated as equation 1 above i.e. where the fixed time period δ is not included.

A maximum value of δ may be estimated from the specifications of the oscillator crystals. Thus, choosing the maximum value of δ ensures that the receiving participant will always start its receiver before the transmitting participant transmits data to the receiving participant.

As an example, δ may be estimated using the accuracy of the crystal oscillators. Assuming an accuracy of ±60 ppm (part per million), then a 16 MHz crystal oscillator can maximally vary by ±960 Hz from the specified frequency. If the crystal oscillator of the transmitting participant is of by +960 Hz i.e. 16 MHz+960 Hz and the crystal oscillator of the receiving participant is of by −960 Hz i.e. 16 MHz−960 Hz, then the frequency difference between the two crystal oscillators is 1920 Hz. Thereby, the drift between the crystal oscillators is $$\frac{1920 \text{ Hz}}{16 \text{ MHz}} = 120\frac{\mu s}{s}.$$

In a transmission scheme in which 27 data packages are transmitted per second, then the maximal drift between the crystal oscillator is approximately 4.44 μs i.e. below 5 μs per data package. Thus, in this example, δ may be set to 5 μs. In another example, δ may be set to 50 μs.

Figure 6:
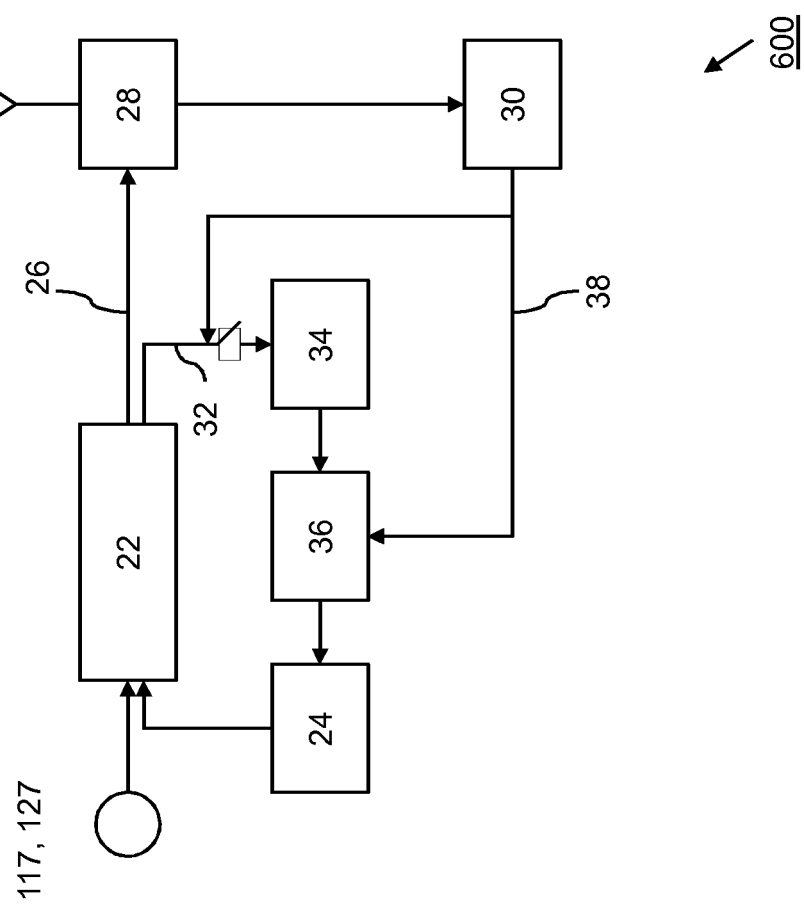
FIG. 6 shows an embodiment of a unit for determining the $\Delta_{avg}$.

FIG. 6 shows an embodiment of a unit 600 for determining the $\Delta_{avg}$. The unit 600 may comprise a clock generator 117, 127, which for example may oscillate at 16 MHz. The clock generator 117, 127 may be connected to a Timer 22, which counts the number of clock cycles. The Timer 22 is also connected to a memory unit 24, which initially may be supplied with a number $\Delta_{avg} \leq \delta$.

When the Timer 22 has counted N clock cycles, a signal 26 is supplied to a radio 28, which triggers activation of the radio 28 so that the radio starts "listening" to the transmitting device (120 in FIG. 1). The radio 28 then supplies a bit stream to the SOF (Start Of Frame) correlator 30, which is able to recognize a given "start of frame" bit message. Before the transmitting device starts transmission, this bit stream may be nonsense. But when the SOF unit recognizes the "start of frame" bit message the Latch contact 32 is activated (closed), so that the Timer 22 is able to write a value D to the Latch 34.

The value D may be the Timer 22 count from the time at which the start of radio 28 signals has been sent.

The unit 600 may additionally be equipped with a MCU (Micro Control Unit) 36, which is supplied with a software program. The MCU 36 is able to read the value D from the Latch 34.

Substantially simultaneously as the SOF correlator 30 sends the signal to the Latch contact 32, another interrupt signal 38 is sent to the MCU 36. This Interrupt signal 38 tells the MCU 36 to start the algorithm. This algorithm uses the values stored in the memory unit 24, e.g. the D and N values above, as input, and the software program uses these values to calculate an updated $\Delta_{avg}$, which is stored in the memory unit 24.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

The invention claimed is:

1. A hearing device comprising:
   a processing unit;
   a filter; and
   a wireless receiver;
   wherein the processing unit is configured to determine a time difference between a start of the wireless receiver and a reception of a corresponding data packet from a transmitter;
   wherein the filter is configured to determine a time period as a function of a plurality of time differences that include the time difference determined by the processing unit;
   wherein the processing unit is further configured to control the wireless receiver such that the wireless receiver is started in the time period before reception of a subsequent data packet from the transmitter;
   wherein the filter comprises a plurality of taps configured to receive the plurality of time differences; and
   wherein the function is associated with the determined time difference and a number of lost data packages since a last successful data packet reception.

2. The hearing device according to claim 1, wherein the taps of the filter are configured to perform cyclically.

3. The hearing device according to claim 1, wherein the filter is implemented in the processing unit, in a memory device, or in both.

4. The hearing device according to claim 1, wherein the function comprises an average over the plurality of time differences.

5. The hearing device according to claim 4, wherein the average comprises an arithmetic mean, a geometric mean, a harmonic mean, or a quadratic mean.

6. The hearing device according to claim 1, wherein the time period is for a first number of receptions, and the filter is configured to provide a second time period for a second number of receptions.

7. The hearing aid according to claim 1, wherein the filter is configured to determine the time period based on an average operation.

8. The hearing aid according to claim 1, wherein the filter is configured to determine an additional time period when the filter has received a new time difference.

9. The hearing device of claim 1, wherein the time period comprises an average over the plurality of the time differences, and the processing unit is configured to determine the average each time the plurality of taps have received the respective time differences.

10. The hearing device according to claim 1, wherein the processing unit is configured to compensate a start of reception utilizing a last calculated time period for which a data packet was received.

11. The hearing device according to claim 6, wherein the processing unit is configured to start the wireless receiver a fixed time period before the transmitter transmits data to the hearing device in a first number of transmissions.

12. A method of compensating a frequency difference between a wireless receiver and a transmitter, the method comprising:
   determining a time difference between a start of the wireless receiver and a reception of a corresponding data packet from the transmitter;
   receiving a plurality of time differences by a plurality of taps, respectively, wherein the taps are parts of a filter, and wherein the plurality of time differences includes the determined time difference;
   determining a time period based on a function that is associated with the determined time difference and a number of lost data packages since a last successful data packet reception; and
   starting the wireless receiver in the time period before reception of a subsequent data packet from the transmitter.

13. The method according to claim 12, wherein the function comprises an average over the plurality of time differences.

14. The method according to claim 12, wherein the time period is determined for a first number of receptions, and the method further comprises determining a second time period for a second number of receptions.

15. The method according to claim 12, wherein the time period is determined based on an average operation.

16. The method according to claim 12, wherein the time period is determined using the filter, and the method further comprises determining an additional time period when filter has received a new time difference.

17. The method according to claim 12, wherein the time period comprises an average over the plurality of the time differences, and wherein the average is determined each time a new time difference is received by one of the taps of the filter.

* * * * *